(12) United States Patent
Carlson et al.

(10) Patent No.: US 6,283,859 B1
(45) Date of Patent: Sep. 4, 2001

(54) MAGNETICALLY-CONTROLLABLE, ACTIVE HAPTIC INTERFACE SYSTEM AND APPARATUS

(75) Inventors: J. David Carlson; Stephen P. Koester, both of Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/189,198

(22) Filed: Nov. 10, 1998

(51) Int. Cl.$^7$ .................................................. A63F 9/22

(52) U.S. Cl. ............................ 463/36; 463/38; 188/267.1

(58) Field of Search ..................... 463/36–38; 192/21, 192/21.5, 841; 475/205–207, 149; 310/92–94, 96, 97–99, 103; 434/62; 188/266, 267, 267.2

(56) References Cited

U.S. PATENT DOCUMENTS

| | | | |
|---|---|---|---|
| 4,444,298 | * 4/1984 | Strangroom | 192/21.5 |
| 4,868,549 | 9/1989 | Beetem et al. . | |
| 4,896,754 | * 1/1990 | Carlson et al. | 192/21.5 |
| 5,007,513 | * 4/1991 | Carlson | 192/21.5 |
| 5,015,926 | 5/1991 | Casler . | |
| 5,090,531 | * 2/1992 | Carlson | 192/21.5 |
| 5,252,249 | * 10/1993 | Kurachi et al. | 252/71 |
| 5,322,484 | * 6/1994 | Reuter | 475/150 |
| 5,354,488 | * 10/1994 | Shtarkman et al. | 252/62.56 |
| 5,547,383 | * 8/1996 | Yamaguchi | 434/62 |

(List continued on next page.)

FOREIGN PATENT DOCUMENTS

| | | |
|---|---|---|
| 0 776 813 A1 | 6/1997 | (EP) . |
| 2300697 | * 11/1996 | (GB) . |
| 10-17152 | * 6/1998 | (JP) . |
| WO 93/14180 | * 7/1993 | (WO) . |
| WO 97/19440 | 5/1997 | (WO) . |

OTHER PUBLICATIONS

Russo and Tadros; Controlling Dissipative Magnetic Particle Brakes In Force Reflective Devices, Advances in Robotics, vol. 42 ASME 1992, pp. 63–70.

Schwarz and Stenzel, Application Of An Electrorheological Fluid Within Hydrodynamic Steering Aid, Actuator 98, 6th International Conference on New Actuators, Jun., 17–19, 1998 pp. 422–425.

Furusho and Sakaguchi, New Actuators Using ER Fluid And Their Applications To Force Display Devices in Virtual Reality And Medical Treatments, ERMR, 1997, pp 1–9.

"Clinical potential and design of programmable mechanical impedances for orthotic applications". William S. Harwin, Lee O. Leiber, Gregory P.G. Austwick, and Chryssa Dislis. *Robotica* (1988) vol. 16, pp. 513–530.

*Primary Examiner*—Mark Sager
*Assistant Examiner*—John M. Hotaling, II
(74) *Attorney, Agent, or Firm*—Randall S. Wayland; Michael M. Gnibus (57) ABSTRACT

According to the present invention, a haptic interface system, also known as a force feedback system, comprises a motor for supplying actuating energy and a magnetically-controllable device that transfers the actuating energy into force feedback sensations. The magnetically-controllable device contains a magnetically-controllable medium beneficially providing variable resistance forces in proportion to the strength of an applied magnetic field. The system further comprises a computer system having a processor that runs an interactive program or event, a video display for displaying the interactive program or event, and a haptic interface device in operable contact with an operator for controlling inputs to the interactive program. Based on the received inputs and on processing the interactive program, the computer system provides a variable output signal, corresponding to a feedback force, to control the magnetically-controllable device in transferring the actuating energy into feedback force that is actively applied to haptic interface device.

47 Claims, 3 Drawing Sheets

U.S. PATENT DOCUMENTS

| | | | |
|---|---|---|---|
| 5,629,594 | | 5/1997 | Jacobus et al. ................. 318/568.11 |
| 5,670,077 | * | 9/1997 | Carlson et al. .................... 252/62.52 |
| 5,717,266 | | 2/1998 | Maynard . |
| 5,736,064 | * | 4/1998 | Edamura et al. ....................... 252/74 |
| 5,742,278 | * | 4/1998 | Chen et al. ........................... 345/156 |
| 5,762,584 | * | 6/1998 | Daniels ................................. 482/75 |
| 5,842,547 | * | 12/1998 | Carlson ............................... 188/267 |
| 5,845,752 | * | 12/1998 | Gopalswamy et al. ............. 192/21.5 |
| 5,845,753 | * | 12/1998 | Bansbach ............................ 192/21.5 |
| 5,848,678 | * | 12/1998 | Johnston et al. .................... 192/21.5 |
| 5,944,151 | * | 8/1999 | Jakobs et al. ...................... 188/267.1 |
| 5,988,336 | * | 11/1999 | Wendt et al. ....................... 192/21.5 |
| 5,989,123 | * | 11/1999 | Tosaki et al. ........................... 463/37 |
| 6,020,875 | * | 2/2000 | Moore et al. ......................... 345/156 |
| 6,020,876 | * | 2/2000 | Rosenburg et al. ................. 345/157 |
| 6,068,249 | * | 5/2000 | Shtarkman ...................... 267/140.14 |
| 6,104,382 | * | 8/2000 | Martin et al. ........................ 345/161 |

* cited by examiner

MAGNETICALLY-CONTROLLABLE, ACTIVE HAPTIC INTERFACE SYSTEM AND APPARATUS

FIELD OF THE INVENTION

The present invention relates generally to haptic interface systems for providing force feedback sensations, and more particularly, to active force feedback systems employing a magnetically-controllable medium to provide resistance forces.

BACKGROUND

Haptic interface systems, also known as force feedback systems, provide an operator holding an interface device, such as a joystick, with "feel" sensations corresponding to whatever is being controlled by the interface device. A common example of such a system is in computer games, where the action on a video display and the movement of a joystick or steering device are coordinated with physical force imparted to the operator's hand, through the joystick or steering device, to provide a simulated "feel" for events happening on the display. For example, in an auto racing game, when an operator steers a car around a sharp turn at high speed, the haptic interface system imparts force on the steering wheel to make it more difficult to turn the wheel into the curve. This force feedback simulates the centrifugal force of the car making the turn and the friction forces applied to the tires as they are turned. Thus, haptic interface systems provide remote simulation of the actual physical feeling associated with an action or event through force feedback.

Typical haptic interface systems include one or more motors connected to the interface device in order to impart the force feedback sensation. Typical motors include direct current (DC) stepper motors and servo-motors. If the interface device is a joystick, motors are used to impart force in an x-direction, in a y-direction, or in combination to provide force in any typical direction that the joystick may be moved. Similarly, if the interface device is a steering wheel, motors are used to imparts rotational force in a clockwise direction and in a counterclockwise direction. Thus, motors are used to impart forces in any typical direction that the interface device may be moved.

In a system using a single motor, the motor may be connected to the interface device through a gear train, or other similar energy transfer device, in order to provide force in more than one direction. In order to enable one motor to be used in a system, a reversible motor is typically utilized to provide force in two different directions. Additionally, mechanisms are required to engage and disengage the various gears or energy transfer devices to provide force in the proper direction at the proper time. In contrast, other typical systems use more than one motor to provide force in the required directions. Thus, current systems utilize a number of differing approaches to handle the delivery of force feedback sensations.

Current haptic interface systems may be disadvantageous, however, for a number of reasons. One primary area of concern is the cost of such systems. One item greatly contributing to the cost of a typical system is the use of DC stepper and servo-motors, and reversible motors. These types of motors are very sophisticated, requiring the ability to change speeds or revolutions per minute (rpm), maintain different speeds, and reverse rotational direction. These features require greater mechanical and electrical complexity, which equates to a comparatively very high cost. Further, these motors need to be small in size in order to keep the haptic interface system from becoming unwieldy. This additionally complicates their design and increases cost. Also, because of their relatively small size, the sophisticated motors typically required in a haptic interface system are only able to generate a limited amount of torque. As such, the operator of an interface device may easily be able to overcome the torque or force feedback supplied by the motor. Thus, providing a small, sophisticated motor for a haptic interface system is, relatively very costly, and may result in insufficient force feedback.

Also disadvantageously, the typical DC motors used in haptic interface systems are not designed to perform in the manner required by the system. In order to provide force feedback, typical systems use direct drive motors configured to mechanically engage the output shaft of the motor with the interface device. For example, the output shaft of a DC motor may be geared to a steering wheel shaft or linked to a slide or other mechanism controlling the movement of a joystick. When the motor engages the gear or slide, the motor drives the interface device to provide force feedback. The operator holding the interface device, however, typically opposes the force feedback. The opposing force supplied by the operator then works against the direction of the motor output, which tends to stall the motor. Not only does this opposing force tend to wear out and/or strip components within the motor or associated gear train, but the stall condition leads to the generation of higher electric currents within the motor, straining the electrical components in the motor. Due to the repetitious nature of a haptic interface system, the reliability and longevity of motors in such haptic interface systems are severely reduced. Thus, motors used in typical haptic interface systems are typically not very well suited for the demanding environment in which they are operated.

Yet another disadvantage of current commercial haptic interface systems is that high impact forces from a motor connected to an interface device may be dangerous for the operator of the interface device. When the haptic interface system requires a quick, high impact force, a motor connected to an interface device may respond with a large force that may injure the operator if the operator is not ready for the abrupt force. This may be corrected for by ramping up the speed of the motor to achieve the force, but then the sensation becomes less realistic. Further, varying the engagement speeds of the motor complicates the software program that is used to run the haptic interface system, thereby further increasing cost. Thus, producing a realistic-feeling high impact force with current haptic interface systems may be dangerous to the operator or may require costly and complex system programming.

Some prior art devices have attempted to overcome some of the drawbacks of current haptic interface systems, with limited results. An electrorheological (ER) actuator utilized in a force display system is proposed by J. Furusho and ME. Sakaguchi in "New Actuators Using ER Fluid And Their Applications To Force Display Devices In Virtual Reality Systems," in the Proceedings of the International Conference on Electro-Rheological Fluids, Magneto-Rheological Suspensions and their Applications, Jul. 22–25, 1997, Yonezawa Japan. An ER actuator comprises a device that contains an ER fluid, which is a substance that changes its shear strength with application of an electric field. The ER fluid can then be used as a clutch or a brake to increase resistance between two members.

The use of such an ER actuator is severely disadvantageous, however, for use in typical haptic interface systems, such as for computer games. One major issue is that an ER actuator presents a major safety problem because of the high electric voltages required to produce the electric field necessary to generate a desired change in shear strength in the ER fluid. For a haptic interface system, a typical ER fluid actuator may require voltages in the range of about 1000 to 5000 volts. Conversely, the motors used in the typical systems described above require in the range of about 100 milliamps (mA) to 1.0 A of current at 12 volts. Thus, the voltage required to operate an ER actuator is very high, making an ER actuator undesirable, and possibly unsafe, for a consumer device subject to a great amount of wear and tear.

Additionally, an ER actuator detrimentally requires expensive seals to hold the ER fluid within cavities within the actuator. Seals frequently wear, causing reliability problems for ER actuators and concerns about ER fluid leaks. Further, the use of seals typically requires machined parts having tight tolerances, additionally increasing the cost of the ER actuator. Also, ER actuators also require expensive bearings to insure the relative positioning of the tight-tolerance parts.

Similarly, precise machining is required for the rotating internal components of an ER actuator, further increasing the cost of the actuator. Because an ER device requires a relatively large amount of surface area between the ER fluid and the two members that the ER fluid contacts, tight-tolerance machining is needed between the multiple, adjacent surfaces of the members. Thus, a relatively large amount of surface area may be required to generate sufficient torque to provide the levels of force feedback required by typical haptic interface systems.

Finally, typical ER actuators that provide appropriate force may be too large to be integrated into a commercial haptic interface system. The device utilized to provide force feedback in a typical haptic interface system must be small and lightweight in order to be practically integrated into the system. An ER actuator meeting these requirements is very costly to produce, besides having the above-stated eficiencies. Thus, utilization of an ER actuator in a typical haptic interface system is not desirable.

Therefore, it is desirable to provide a haptic interface system that is more simple, cost-effective, reliable and better performing than the above-stated prior art.

SUMMARY OF THE INVENTION

According to a preferred embodiment of the present invention, a haptic interface system comprises a motor for providing actuating energy and an associated magnetically-controllable device that advantageously transfers a variable amount of the actuating energy into a variable feedback force. The magnetically-controllable device beneficially comprises a magnetically-controllable medium that provides a variable resistance force in proportion to the strength of an applied magnetic field. The system further comprises a computer system adapted to run an interactive program, a video display for displaying images associated with the interactive program, a haptic interface device in operative contact with an operator who controls and responds to the interactive program, and a sensor that detects the position of the haptic interface device and provides a corresponding variable input signal to the computer system. The motor is preferably a direct current motor rotating in a single direction at a constant speed. The motor and magnetically-controllable device, acting as a clutch to allow slip within the magnetically-controllable device rather than stalling the motor, synergistically comprise a low cost and efficient haptic interface system.

The computer system processes the interactive program, and the variable input signal from the sensor, and provides a variable output signal corresponding to a feedback force that provides the operator with realistic sensations corresponding to the interactive program. The variable output signal energizes a magnetic field generating device, disposed adjacent to the first and second members, to produce a magnetic field having a strength proportional to the feedback force. The magnetic field is applied across the magnetically-controllable medium, which is disposed in a working space between a first member and a second member. The applied magnetic field changes the resistance forces of the magnetically-controllable medium associated with the relative movement between a first member engaged by the motor and a second member in communication with the haptic interface device. The first and second members may be adapted for linear, rotational and curvilinear relative movement. The actuation energy of the motor is transferred through the first member to the second member in variable amounts corresponding to the resistance forces provided by the magnetically-controllable medium to provide a feedback force to the haptic interface device. As such, the variable output signal from the computer system controls applied magnetic field strength, and hence the variable resistance forces available. This beneficially allows the motor to run at an approximately constant speed, while the frequency and intensity of the feedback force is managed through the control of the magnetically-controllable device, minimizing stress and wear on the motor. Thus, the present haptic interface system provides the interactive program's operator with realistic force feedback sensations generated by the magnetically-controllable device.

In a preferred embodiment, the magnetically-controllable medium within the magnetically-controllable device is contained by an absorbent element disposed between the first member and the second member. The absorbent element may be compressed from a resting state, preferably the amount of compression is in the range of about 30%–70% of its uncompressed state. The absorbent element may be formed as a matrix structure having open spaces for retaining the magnetically-controllable, medium. Suitable materials for the absorbent element comprise open-celled foam, such as from a polyurethane material, amongst others.

The magnetically-controllable medium is a medium having a shear strength that varies in response to the strength of an applied magnetic field. One preferred type of magnetically-controllable medium is magnetorheological fluid. is mentioned above, the magnetic-field generating device, preferably an electromagnetic coil, provides the applied magnetic field. The coil typically comprises a wire having a number of turns and a certain gauge. The number of turns and gauge of the wire, however, are dependent upon the desired range of the variable strength magnetic field and upon the electric current and voltage of the variable output signal.

The haptic interface device of the present invention may be any device in operative contact with the operator for controlling and responding to the interactive program, such as a video game. For example, a suitable haptic interface device may comprise a steering device or a joystick.

The computer system may comprise a host computer, a controller and an amplifier. The controller and amplifier, as is explained below, may alternatively be separate components or part of a haptic interface unit. The host computer comprises a processor that runs the interactive program. The controller comprises a microprocessor and firmware that are used to modify the variable input signal received from the sensor and the variable output signal received from the host computer. The controller then provides a modified variable input signal to the host computer and a modified variable output signal to the magnetically-controllable device. The controller modification function performed by the controller enables communication between the host computer and the magnetically-controllable device and the sensor. The amplifier further modifies the output signal to provide a modified variable output signal in situations where the output signal from host computer is not sufficient to control the magnetically-controllable device. The controller and amplifier may act as local processors, reducing the burden on the host computer by providing output signals upon locally processing certain sensor input signals that do not need to be processed by the host computer.

In one embodiment, the present invention discloses a haptic interface unit comprising the motor and magnetically-controllable device, as described above, mounted within a frame. The haptic interface unit may further comprise the haptic interface device, sensor, control unit and amplifier, as described above.

In another embodiment, a haptic interface system comprises a host computer, haptic interface device, sensor and control unit, substantially as described above. This embodiment further includes a magnetically-controllable device having a motor for providing actuating energy, a first energizable portion for providing force feedback actuating energy in a first rotational direction, and a second energizable portion for providing force feedback actuating energy in a second rotational direction.

In yet another embodiment, a force feedback control system comprises a computer system for receiving a variable input signal and providing a variable output signal, where the computer system is adapted for running an interactive program that processes the variable input signal and in response derives the variable output signal corresponding to a level of rotational force feedback. This embodiment also includes a rotatable shaft for transferring the level of rotational force feedback, and a rotor fixedly attached to the shaft, where the rotor has a first side and a second side. A sensor device is in communication with the rotatable shaft and the computer system. The sensor device provides the variable input signal representative of a rotational position of said rotatable shaft to the computer system.

The control system further includes a first rotatable member adjacent to the first side of the rotor and a second rotatable member adjacent to the second side of the rotor. A first coil is disposed between the first rotatable member and the rotor, where the first coil energizable in response to the variable output signal to produce a first, variable-strength magnetic field. Similarly, a second coil is disposed between the second rotatable member and the rotor, where the second coil is energizable in response to the variable output signal to produce a second, variable-strength magnetic field. Also, a first absorbent matrix comprising a magnetically-controllable medium is disposed between the first rotatable member and the rotor, where the first absorbent matrix provides variable resistance between the first rotatable member and the rotor in proportion to the strength of the first magnetic field. Similarly, a second absorbent matrix also comprising a magnetically-controllable medium is disposed between the second rotatable member and the rotor, where the second absorbent matrix provides variable resistance between the second rotatable member and the rotor in proportion to the strength of the second magnetic field. Further, the control system comprise a motor for providing the rotational force feedback energy in communication with the first rotatable member and the second rotatable member, where the motor is adapted for rotating the shaft in a first direction by transferring energy through the first rotatable member to the rotor and the motor is also adapted for rotating the shaft in a second direction by transferring energy through the second rotatable member to the rotor through the selective energization of the first coil and the second coil. In this embodiment, the computer system may additionally be in communication with the motor. Finally, the control system may further include a haptic interface device in communication with the rotatable shaft for receiving the rotational force feedback.

DETAILED DESCRIPTION OF THE INVENTION

Figure 1:
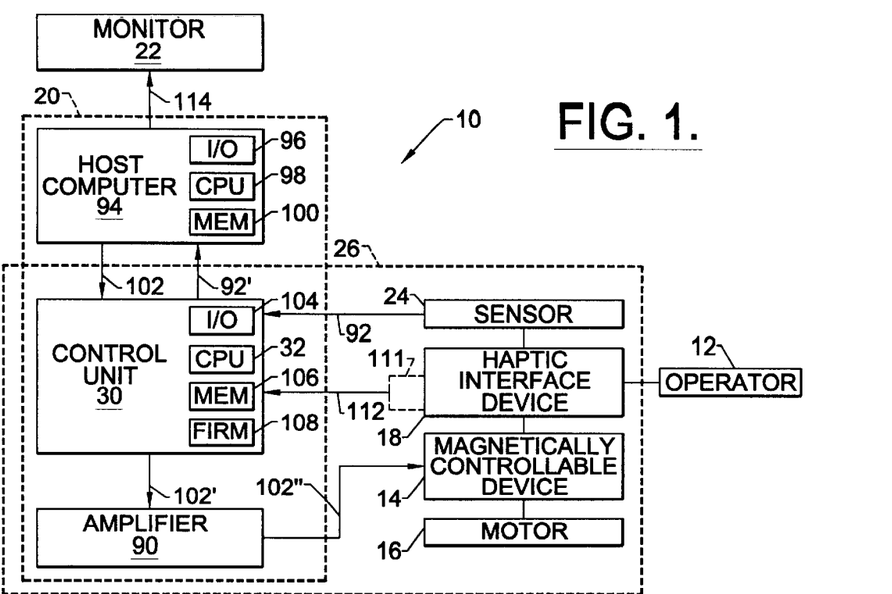
FIG. 1 is a schematic representation of a haptic interface system according to the present invention.
Figure 2:
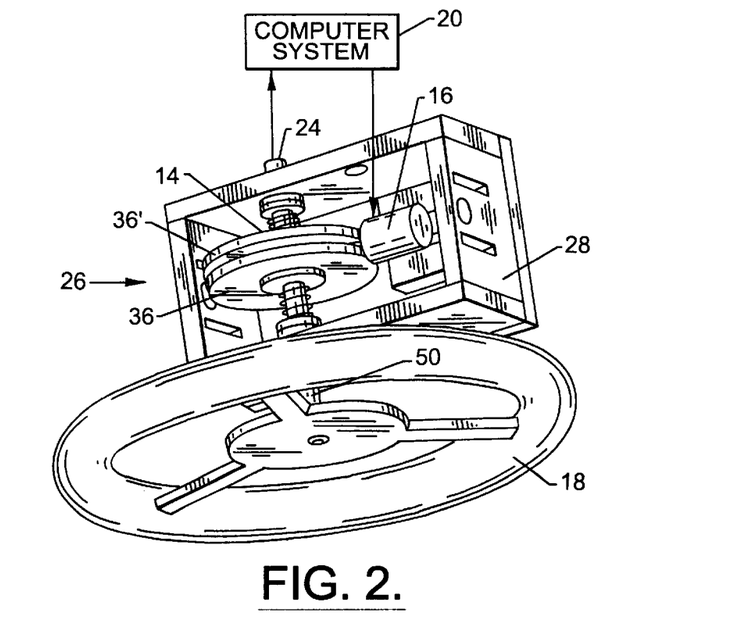
FIG. 2 is a perspective view of one embodiment of a haptic interface unit according to the present invention.

According to the present invention, referring to FIG. 1, an active haptic interface system 10 for providing force feedback sensations to an operator 12 comprises a magnetically-controllable device 14 including a magnetically controllable medium, driven by a motor 16, that imparts active forces, or active force feedback sensations, to the operator through a haptic interface device 18 such as a steering wheel. Operator 12 moves haptic interface device 18 to control and respond to an interactive program run by computer system 20, with corresponding images displayed on video display 22. A sensor 24 detects the movements of haptic interface device 18 and reports the movements to computer system 20. Alternatively or in addition, a sensor may sense applied torque. Computer system 20 interactively responds by generating new images on display 22 and by actively controlling magnetically-controllable device 14 to provide variable active feedback forces corresponding to the movement of haptic interface device 18 and corresponding to the images on the display 22. Computer system 20 sends a signal, corresponding to a desired active force feedback sensation, to magnetically-controllable device 14. The signal commands magnetically-controllable device 14 to vary its resistance in a manner that transfers energy from motor 16 to haptic interface device 18 to produce the desired active force feedback sensation. Thus, haptic interface system 10, and particularly magnetically-controllable device 14 in combination with motor 16, advantageously provide a simple, cost-effective, high performance solution for supplying active, variable feedback forces enabling operator 12 to feel realistic force feedback sensations.

Haptic interface system 10 of the present invention is particularly beneficial in providing a very cost efficient, compact and robust active force feedback system. As used herein, the term "active" refers to the ability to independently impart an active (positive acting, i.e., performing useful work) force to haptic interface device 18. In contrast to prior art haptic interface systems that provide active force feedback utilizing expensive stepper and servo motors directly connected to the haptic interface device, haptic interface system 10 of the present invention advantageously utilizes a simple, inexpensive unidirectional motor 16 in combination with magnetically-controllable device 14 to provide active force feedback sensations. Magnetically-controllable device 14 acts as a clutch, allowing slip to occur within the magnetically-controllable device 14 rather than stalling the motor 16.

In contrast, prior art systems allow stalling to occur within their expensive motors, causing electric current within the motor to rise, which subjects the motor to high stress and increases the wear on the motor. The continual wear and tear to which the motors in prior art systems are repetitively exposed explains why the prior art systems require such expensive and heavy-duty motors. The prior art systems simply are not well-suited and not efficiently designed for the demanding environment of an active force feedback system. These problems are alleviated with the present invention, however, as slip within magnetically-controllable device 14 reduces stall conditions imparted to the motor 16. As a result, less expensive and less heavy-duty motors can be utilized in the present invention, thereby reducing the cost of the system.

Through continual feedback between haptic interface device 18 and computer system 20, the computer system directs magnetically-controllable device 14 to provide variable resistance that transfers energy from motor 16 to the haptic interface device to impart a force. Further, based on processing the interactive program, computer system 20 directs the resistance provided by magnetically-controllable device 14 to vary in conjunction with images on display 22 and with the movement of the haptic interface device 18. As one skilled in the art will realize, computer system 20 is capable of processing numerous games or events that may comprise interactive program, and the examples given below are not intended to be limiting.

For example, if that computer system 20 is running a race car driving interactive program, and operator 12 attempts to move haptic interface device 18 in a direction that steers the race car to deflect off of a non-destructible wall, the computer system controls magnetically-controllable device 14 to transfer energy from motor 16 to impart an impulse force to haptic interface device 18 upon impacting the wall. Additionally, as long as operator 12 continues to steer into the wall, magnetically-controllable device 14 and motor 16 provide resistance forces equal to or greater than the force applied to the haptic interface device 18 by the operator to simulate the immovable, non-destructible feel of the wall.

Similarly, given the same interactive race car driving program and operator 12 driving the car around a curve, computer system 20 provides a signal that directs magnetically-controllable device 14 to provide a variable amount of resistance that transfers energy from motor 16 to provide a force feedback that opposes the force applied by operator 12 to haptic interface device 18. The opposing force varies depending upon the speed and traction of the car and the sharpness of the curve, for example. As a result, system 10 of the present invention provides resistance force feedback sensations felt by operator 12 through haptic interface device 18, giving the interactive program a realistic feel for the maneuver attempted. Thus, the system of the present invention imparts an active feedback force to the haptic interface device to simulate the real-life forces that would be experience for the event displayed on the display 22.

Referring now to FIG. 1 through FIG. 4, one embodiment of a haptic interface unit 26 comprises magnetically-controllable device 14, motor 16, haptic interface device 18 and sensor 24 mounted to a frame 28. As one skilled in the art will realize, haptic interface unit 26 may also include a control unit 30 having a processor 32 for locally controlling communications between computer system 20 (FIG. 4) and the haptic interface unit components. Computer system 20 drives the motor 16 at a constant speed, and is also is in communication with sensor 24 and first and second magnetic-field generating devices 34, 34' within magnetically-controllable device 14. It should be noted that for clarity of FIG. 3, the components on the other side of motor 16 and the bottom and end plates of frame 28 are removed. It should be understood that the components on the other side are a mirror image of those shown. Motor 16 advantageously turns first and second disc-shaped members 36, 36' in opposite directions through engaging member 38, while the motor 16 turns the motor's output shaft 50 in a single direction. As members 36, 36' are counter-rotated by motor 16, computer system 20 selectively energizes magnetic-field generating devices 34, 34' in response to processing the interactive program and variable input signal from position sensor 24. The selective energization results in transferring rotation of the associated member 36 or 36' to drive shaft 50 that is fixedly attached to central rotor 42. The energy of motor 16 is transferred to rotor 42, and hence to drive shaft 50, by a change in resistance between the rotor and member 36 or 36', or both resulting from applying a magnetic field across one of the respective magnetically-controllable medium 44 or 44', or both contained in absorbent element 46 or 46'. System 10 of the present invention thereby beneficially provides active, bi-directional forces, depending on the selective energization of magnetically-controllable device 14. Thus, an operator (not shown) in operative contact with a haptic interface 18, a steering wheel in this case, feels active force feedback sensations resulting from the energy transferred through magnetically-controllable device 14 from motor 16.

Figure 3:
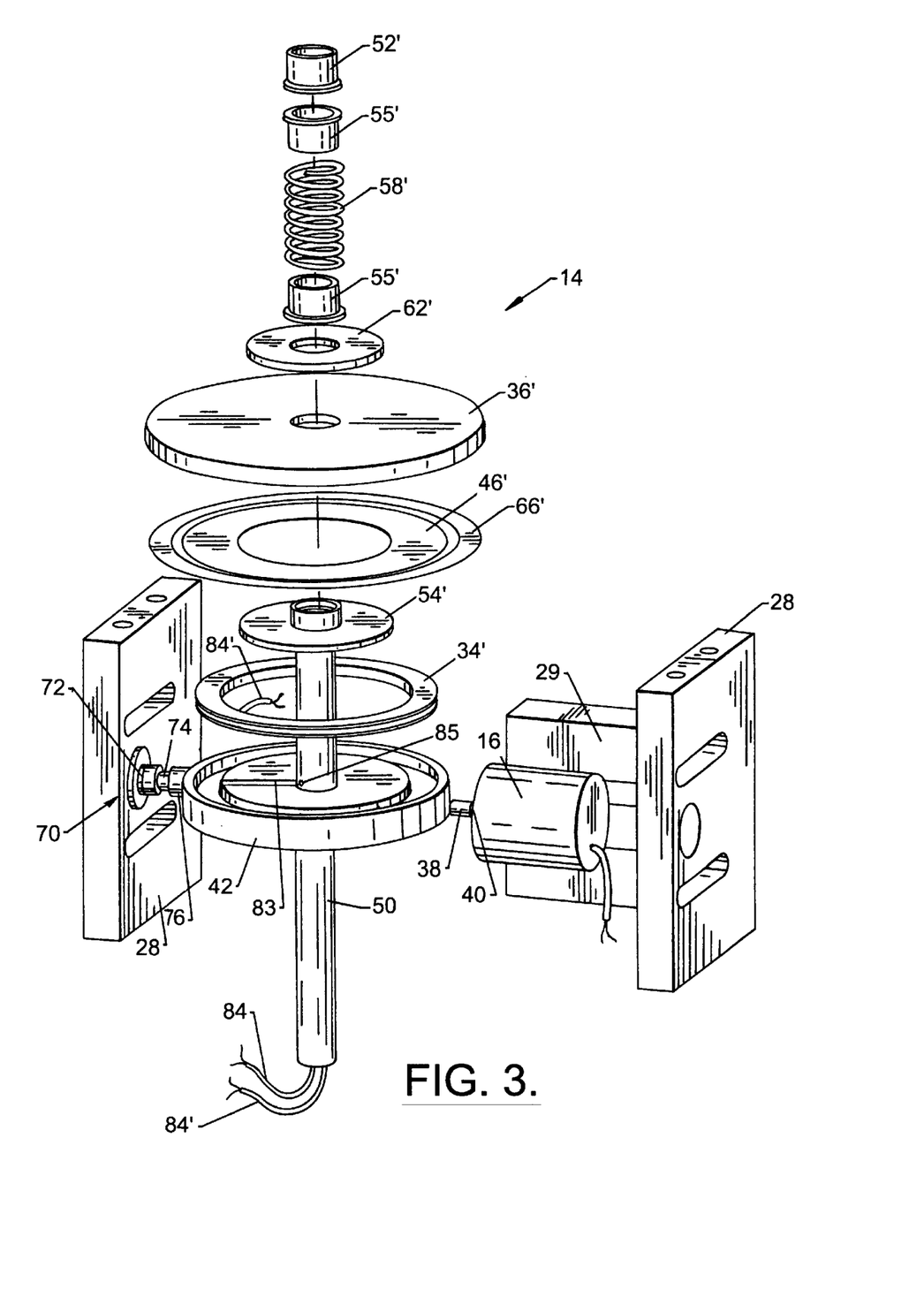
FIG. 3 is an exploded perspective view of the hepatic interface unit of FIG. 2, with some components omitted for clarity.
Figure 4:
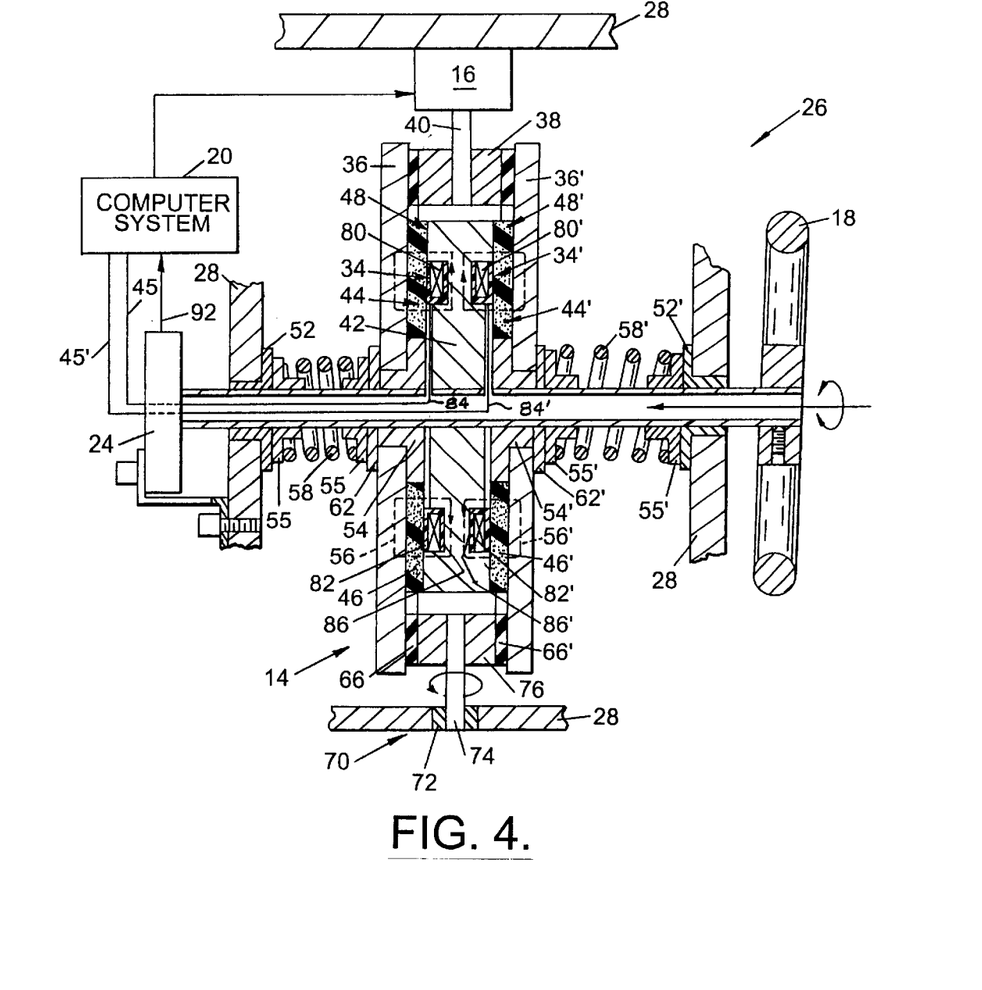
FIG. 4 is a cross-sectional view of the haptic interface unit in FIGS. 2 and 3.

Magnetically-controllable device 14 beneficially contributes to the cost efficient, compact and robust design of haptic interface system 10. Referring to FIGS. 3 and 4, a typical magnetically-controllable device 14 comprises first and second magnetically-controllable mediums 44, 44' respectively disposed in working spaces 48, 48' between first rotatable member 36 and rotor 42 and between second rotatable member 36' and rotor 42, respectively. Disc members 36, 36' are disposed for independent, relative rotation about shaft 50, while rotor 42 is fixed to, and rotates with, the shaft.

Shaft 50 is rotatably fixed to frame 28, preferably in two places on opposite sides of magnetically-controllable device 14. Bushings 52, 52' may be positioned within ends of frame 28 to radially support shaft 50 while allowing relatively frictionless rotation thereof. Suitable materials for bushings 52, 52' include Nylon, Teflon®, Delrin® or MDS filled Nylon, or any other similar material or device, such as a bearing, that can bear the weight and rotational forces of shaft 50 and magnetically-controllable device 14 without substantially deforming and that provides relatively frictionless rotation between shaft 50 and frame 28.

Similarly, spacers 54, 54' may be respectively positioned between members 36, 36' and shaft 50 to reduce friction between the members and the shaft. Low friction is important because shaft 50 is often rotating in a direction opposite that of member 36 or 36', depending on which magnetic-field generating device 34 or 34' is selectively energized. Friction between shaft 50 and members 36, 36' should preferably be minimized in order to increase the efficiency and response of system 10 and reduce drag on the shaft.

Suitable materials for spacers 54, 54' include Nylon, Teflon®, Deirin®, and MDS filled Nylon, or any other material or device, such as a bearing, that reduces friction between shaft 50 and members 36, 36'. Additionally, spacers 54, 54' may be positioned between members 36, 36' and rotor 42 to set the appropriate spacing between each member and the rotor. Also, spacers 54, 54' help to reduce friction between members 36, 36' and rotor 42, for the same reasons as described above.

Magnetically-controllable mediums 44, 44' are respectively under the influence of first and second magnetic-field generating devices 34, 34', selectively energizable to produce a variable strength magnetic field across the respective, adjacent medium. The variable strength magnetic field is in proportion to the variable output signal 45, 45' from computer system 20, which corresponds to a desired feedback force computed by the computer system. Each magnetically-controllable medium 44, 44' is a medium that provides a change in resistance to relative movement in proportion to an applied magnetic field. For example., magnetically-controllable mediums 44, 44' may have a shear strength that changes in proportion to the magnitude of an applied magnetic field. In other words, the "apparent viscosity" of the medium changes proportionally with the strength of an applied magnetic field, providing shear force to resist relative movement between each respective rotatable member 36, 36' and rotor 42. A suitable medium for magnetically-controllable mediums 44, 44' may comprise a magnetorheological fluid such as described in commonly assigned U.S. Pat. Nos. 5,683,615 and 5,705,085 hereby incorporated by reference. Other fluids, such as carbonyl iron dispersed in hydrocarbon oil, or and any medium exhibiting a change in properties in response to an applied magnetic field. Other magnetorheological fluids which may be used in the present invention are disclosed in, for example, U.S. Pat. No. 5,382,373 to Carlson et al. and U.S. Pat. No. 5,578,238 to Weiss, et al., hereby incorporated by reference.

First and second members 36, 36' are each rotatable by motor 16 and located adjacent to their respective magnetic-field generating device 34, 34'. Members 36, 36' are preferably disposed on opposite sides of rotor 42 and preferably both members are counter-driven by motor 16. Preferably, motor 16 rotates members 36, 36' continuously, and in opposite directions, in order to reduce the complexity and cost of the motor and to take advantage of the momentum of the rotating member upon engagement with rotor 42 to provide force feedback sensations. As one skilled in the art will realize, however, motors having various operating specifications, such as continuous rotation versus rotation on demand and unidirectional rotation versus bi-directional rotation, may be effectively utilized with the present invention.

Members 36, 36', as well as rotor 42, each preferably include a magnetically permeable material, such as magnetically-soft steel, for example AISI 1018 steel or AISI 12L14 steel, in order to act as pole pieces to produce a magnetic field across respective mediums 44, 44', as indicated by flux lines 56, 56'. Members 36, 36' may be selectively in communication with haptic interface device 28 upon energization of their respective magnetic-field generating device 34, 34'. As such, the operator 12 in contact with haptic interface device 18 during the selective energization feels the changed resistance forces provided by the selectively energized magnetically-controllable medium 44, 44'. This results in a transfer of energy between first member 36 and rotor 42 or second member 36' and rotor 42 dependent upon which generating device 34, 34' is energized. Significant shear force resisting the relative movement of first or second member 36, 36' and rotor 42 can be obtained with a small amount of magnetically-controllable medium 44, 44' between rotor 42 and the respective member. Thus, movements that include shear movement between either member 36 or 36' and rotor 42 can be variably controlled by the magnetically-controllable device according to the present invention.

Additionally, magnetically-controllable device 14 preferably contains substantially the entire amount of each body of magnetically-controllable mediums 44, 44' respectively at working spaces 48, 48'. Any suitable means for containing mediums 44, 44' at working spaces 48, 48' can be used. According to a preferred embodiment of the invention, means for containing magnetically-controllable mediums 44, 44' within respective working spaces 48, 48' comprises a first 46 and second 46' absorbent elements, respectively. Absorbent elements 46, 46' comprise a material that can take up and hold magnetically-controllable medium 44, 44', for example by wicking or capillary action. Such absorbent elements and device including same are further described in U.S. application Ser. No. 08/959,775 to Carlson entitled "Controllable Medium Device and Apparatus Utilizing Same," which is hereby incorporated by reference herein. Absorbent elements 46, 46' preferably have a matrix structure with open spaces for retaining respective magnetically-controllable mediums 44, 44'. While each body of magnetically-controllable medium 44, 44' is held within the spaces in each respective absorbent elements 46, 46', the material itself may or may not be absorbent.

A particularly preferred material for absorbent elements 46, 46' is a sponge-like material, for example, an opencelled foam or partly open-celled foam. Suitable materials for making such foams comprise polyurethane, rubber, silicone rubber, polyamide, neoprene, loner, melamine, polyimide high temperature foam, and metal foam. Additionally, other exemplary absorbent elements include felts, including felts made of material such as Nomex aramid fiber, polybenzimadazole fiber, Teflon fiber and Gore-Tex fiber, fiberglass wicking, and woven brake or clutch lining material Other materials and structures are also suitable, such as a metal mesh, a brush, or a flocked surface material.

Absorbent elements 46, 46' also beneficially allow for reduced tolerances, between the components of magnetically-controllable device 14, thereby reducing cost. In order to offset the affects of wear at the surface of absorbent elements 46, 46', and to provide a robust design, it is desirable to have each absorbent element compressed between rotor 42 and the respective member 36, 36'. Coil springs 58, 58' may be positioned between frame 28 and members 36, 36' to provide compressive forces to absorbent elements 46,46'. Further, coil springs 58, 58' may be positioned between bushings 55, 55' which rest against discs 62, 62'. Wear discs 62, 62' reduce the friction between the rotating members and the coil springs 58, 58'. The components of the device 14 are centered by the springs 58, 58', idler 70 and engagement member 38. Suitable materials for wear discs 62, 62' and bushings 55, 55' include Teflon®, Nylon, Delrin®, MDS filled Nylon or any other suitable material or device, such as a bearing, that reduces friction between the rotating members and the collar and/or coil springs.

Absorbent elements 46, 46' may be utilized without any compression, but each absorbent element is preferably compressed between about 30% and 70% from a resting state to its installed state. Thus, by containing substantially the entire amount of each body of controllable medium 44, 44' at respective working spaces 48, 48', and by allowing for wear of absorbent elements 46, 46', the present invention avoids the need to provide a large quantity of medium, and the associated seals, bearings and containing devices of the prior art, and accordingly reduces the tight tolerances formerly needed on all components.

Absorbent elements 46, 46' are preferably fixed to their respective rotatable member 36, 36' to insure that they remain disposed in respective working spaces 48, 48'. Alternately, elements 46, 46' may be affixed to either side of rotor 42. According to a preferred embodiment, absorbent elements 46, 46' are respectively adhesively bonded to the inner faces of members 36, 36', for example, by a pressure sensitive adhesive. A preferred material for absorbent elements 46, 46' is an opencelled polyurethane foam having a pressure sensitive adhesive on one side. Alternatively, absorbent elements 46, 46' may be shaped so that they are held in place by the structure of the member, for example, a tubular shaped foam material may be fitted around a member as a sleeve. Finally, each absorbent element 46, 46' does not need to completely fill each respective working space 48, 48'.

Motor 16, as discussed above, preferably comprises a simple, direct current (DC) motor, preferably rotating in a single direction at a single operating speed. A single direction, single speed motor greatly simplifies the present invention and reduces cost relative to the motors required in the prior art. Examples of a suitable motor 16, comprise small permanent magnet motors manufactured by Buhler, Johnson, Dayton or Canon.

Again referring to FIGS. 3 and 4, motor 16 is mounted to a v-block of frame 28 by suitable means such as a c-clamp, bracket or retention between members of frame 28 upon assembly. Motor 16 additionally comprises an output shaft 40 that is in communication with both members 36, 36'. Output shaft 40 may directly engage members 36, 36', or preferably the output shaft comprises an engaging member 38, such as a pinion, geared wheel or a friction wheel, connecting the output shaft and the members. Further, engagement rings 66, 66' may be disposed between each member 36, 36' and shaft 40 or engaging member 38 to provide increased friction or efficiency to improve the transfer of energy from motor 16 to the members. Suitable materials for engagement rings 66 and 66' include elastomer, such as natural rubber, nitrile or neoprene, or any other suitable material or device, such as gears, that provide increased efficiency in transferring energy from motor 16 to members 36, 36'.

Shaft 40 or engaging member 38 and members 36, 36' have a ratio of effective diameters, where the "effective diameter" is the diameter of each respective component at the point where they connect, suitable for transferring the rotational energy of motor 16 to rotor 42. This ratio provides enough torque to generate realistic force feedback sensations to operator 12 through haptic interface device 18. For example, if the haptic interface device 18 is a 6–10 inch diameter steering wheel, and that motor 16 is a direct current motor spinning at about 1000–4000 rotations per minute (rpm), then the effective diameter ratio between members 36, 36' and shaft 40 or engagement member 38 is preferably between about 10:1 and 50:1, and most preferably about 18:1.

Idler device 70 is mounted to frame 28, preferably using bearing device 72 such as a roller bearing Idler device 70 is disposed between members 36, 36', preferably on the opposite side of magnetically-controllable device 14 from motor 16. Idler device 70 is a rotational member that complements motor 16 and prevents the formation of an angle between members 36, 36' that might cause disengagement with the motor. Similar to motor 16, idler device 70 comprises an output shaft 74 that is in communication with both members 36, 36'. Output shaft 74 may engage members 36, 36', or preferably the output shaft comprises an engaging member 76, such as a pinion, geared wheel or a friction wheel, connecting the output shaft and the members. As with motor 16, engaging member 76 preferably contacts engagement rings 66, 66'. Alternatively, more than one idler may be provided, which are located at 120 degrees clockwise and counter-clockwise from the position of motor 16.

Referring to FIGS. 3 and 4, first and second magnetic-field generating devices 34, 34' respectively comprise first and second coils 80, 80' formed of an electrically conducting wire wound about a retainer 82, 82', such as a bobbin or spool. The hoop windings of wire forming each coil 80, 80' are wound such that energizing a coil with electricity produces an induced magnetic field, respectively represented by flux line 56, 56', that intersects magnetically-controlled medium 44, 44'. The induced magnetic field is proportional to the electric current supplied to energize the coil and the number of windings, and is controlled by the output signal 45, 45' from computer system 20. The wire forming each coil 80, 80', as will be realized by one skilled in the art, may be selected from a broad range of electrically-conducting materials, depending on the range of the desired magnetic field strength, the range of desired electrical current, space constraints, and voltage. For example, wire may comprise electrically conductive materials such as copper, aluminum, gold, silver, or the like. Similarly, the gauge of the wire and the number of windings within each coil 80, 80' are dependent upon the application, and can be determined by methods known by one of ordinary skill in the art.

First and second magnetic field generating devices 34, 34', respectively, may be adjacent to first member 36 and second member 36', respectively, but are preferably disposed within recesses 86, 86', respectively, within opposing axial faces of rotor 42. As one skilled in the art will realize, however, magnetic-field generating devices 34, 34' may be located anywhere adjacent rotor 42 and the respective magnetically-controllable medium 44, 44' and the associated rotatable member 36, 36' in order to produce a magnetic flux therethrough.

Wires comprising each respective coil 80, 80' are connected by lead wires 84, 84' to computer system 20, which provides a signal 45, 45' to selectively energize each coil, as is discussed in further detail below. Lead wires 84, 84' may be fed through shaft 50, which is preferably hollow, and threaded through holes 85 in shaft to respectively connect to coils 80, 80' of generators 34, 34' to computer system 20. Grooves 83 may be formed in one or more sides of rotor 40 to receive wires 84, 84'. Because wires 84, 84' may be mounted to a moving component, such as rotor 42, there may be a need to restrict the movement of that member in order to avoid breaking the wire by excessive stretching, bending or rotation of the wires. Alternatively, means may be provided that allows a connection between the wires and computer system 20 even with excessive linear, rotational, pivotal or curvilinear movement. For example, a slip-ring connector, a wire take-up reel, and a coiled wire may be utilized to allow for great amounts of movement while maintaining a reliable connection. These alternatives are generally more costly, however, and thus are not as desirable for a cost efficient haptic interface system.

Referring to FIG. 1, magnetically-controllable device 14 is preferably integrated with haptic interface device 18 and sensor 24 to comprise a haptic interface unit 26. Haptic interface unit 26 may additionally comprises a control unit 30 and/or a signal amplification device 90, as will be discussed in more detail below. Haptic interface unit 26 may further comprise a frame 28 for mounting the above-mentioned components. Frame 28 may additionally include a housing or shell to protect the internal components from external elements.

A suitable haptic interface device 18 may comprise a steering wheel, a joystick, a steering yoke, a seat, a motor bike frame, a jet ski frame, a downhill ski frame, or a foot pedal, and any other device in operable contact with operator 12. Referring to FIG. 3, haptic interface device 18 (FIG. 4) is fixed to shaft 50, such as by force fit, bonding or mechanical means such as a clamp or a set screw. As such, operator 12 in operative contact with device 18, in this case a steering wheel, also rotates shaft 50. Likewise, shaft 50 is also rotated by motor 16 through the selective engagement of rotating members 36 or 36' with rotor 42, which is fixed to shaft 50. Thus, haptic interface device 18 transfers energy from motor 16 to operator 12 to provide active force feedback sensations.

Sensor 24 is in communication with haptic interface device 18 (FIG. 4) f)r identifying a detected position within any of the plurality of positions within which the haptic interface device may be moved. Sensor 24 provides a variable input signal 92 to computer system 20 based on the detected position. Because haptic interface device 18 may be continually moving, sensor 24 must quickly provide computer system 20 with an updated detected position of the haptic interface device in order to provide a realistic feel to the interactive program. Ideally, sensor 24 provides computer system 20 with a continuous signal, such as an electrical current, resistance, voltage or digital pulse that varies in response to the movement of the detected position, and hence the movement of haptic interface device 18. By providing a continuous signal to computer system 20, sensor 24 provides substantially instantaneous feedback on the position of haptic interface device 18 to the computer system 20. Suitable sensors may comprise a potentiometer, such as Clarostat 10K ohm potentiometer, an optical encoder, such as a Clarostat Series 6000 optical rotary encoder, or any type of rheostat or variable resistor.

Referring to FIG. 4, for example, sensor 24 such as a potentiometer may be mounted on shaft 50, which is fixedly connected to a haptic interface device 18, a steering wheel in this case, to detect and report the rotation of the steering wheel and provide a signal 92 to computer system 20. Also, more than one sensor 24 may be required to detect complex movements of haptic interface device 18. For example, if haptic interface device 18 is a joystick, one sensor 24 may be connected to a component of the joystick to determine a movement in the x-direction, while another sensor 24 may be connected to another component of the joystick to determine a movement in the y-direction. In this example, the x-direction sensor and the y-direction sensor may each send a variable input signal corresponding to a detected joystick position to computer system 20.

Referring to FIG. 1, computer system 20 at least comprises a host computer 94, and may include control unit 30 and amplification device 90, among other components required to communicate with haptic interface device 18. Host computer 94 typically includes an input/output 96 for sending/receiving electrical signals, a processor 98 and a memory 100 for processing and storing electrical signals representative of an interactive program, for example. A suitable host computer 94 is, for example, a personal computer such as a Compaq, IBM Gateway or other computer adapted for running executable programs. Input/output 96 may comprise a plurality of serial and/or parallel communication ports, such as RS-232 type ports, and high-speed bi-directional communication channels like the Universal Serial Bus (USB). Processor 98 may comprise an Intel Pentium microprocessor, for example. Memory 100 may comprise Random Access Memory (RAM) and Read-Only Memory (ROM), as well as other well-known types of memory. As one skilled in the art will appreciate, there is a broad range, depending upon the particular application, of personal or other computers, input/outputs, processors and memories that may be utilized with the present invention.

Host computer 94 receives the variable input signal 92 from sensor 24 and provides a variable output signal to magnetically-controllable device 14. As discussed above, there is a continual feedback loop between computer system 20 and haptic interface device 18, and hence between host computer 94, magnetically-controllable device 14 and sensor 24. The interactive program being processed by host computer 94 uses the variable input signal from sensor 24 as an input to the interactive program Using this input, host computer 94 further processes the interactive program to determine the variable output signal to send to magnetically-controllable device 14.

For example, the interactive program within host computer 94 processes an input signal 92 from sensor 24 and determines a resistance force required from magnetically-controllable device 14 to coordinate what operator 12 is viewing on display 22 with what the operator is feeling through haptic interface device 18 to simulate real-life sensations. Host computer 94 sends a signal 114 to display 22 to update the image being displayed, and concurrently sends a output signal to magnetically-controllable device 14. The output signal sent to magnetically-controllable device 14, for example, may be an electric current having a value in proportion to a resistance force desired to be felt by operator 12.

Referring to FIG. 4, the electric signal may be transferred through wires 84 or 84' to selectively energize magnetic-field generating device 34 or 34'. The resistance forces between member 36 or 36' and rotor 42 may be changed by the magnetic field produced across magnetically-controllable medium 44 or 44'. As a result, a change in the energy transferred from motor 16, through member 36 or 36', rotor 42 and shaft 50 to device 18 is felt by operator 12. Thus, operator 12 feels the active force applied by magnetically-controllable device 14 transferring the energy from motor 16 to the haptic interface device, thereby providing force feedback sensations.

While, in general, computer system 20 receives a variable input signal 92 from sensor 24 and generates a variable output signal to magnetically-controllable device 14, a number of different components may be involved in the signal transactions. Referring to FIG. 1, for example, host computer 94 may send output signal 102 comprising an electric current proportional to a desired resistance force to be applied to haptic interface device 18. Output signal 102 may be received by control unit 30 for further processing. The control unit 30 would receive a low power control signal 102 and will process and convert it to a proportionate current for driving the magnetically controllable device 14. Control unit 30 may be a microcomputer or microcontroller having an input/output 104, processor 32 for processing electrical signals, memory 106 for storing electrical signals, and/or firmware 108 that stores and processes electrical signals, where the electrical signals are representative of a local interactive program or inputs from other devices with system 10. Input/output 104, processor 32, and memory 106 may be substantially similar to those described above for host computer 94, however, the capabilities of control unit 30 may be more limited to reduce cost. Control unit 30 processes output signal 102 from host computer 94 and provides a modified output signal 102'.

Additionally, control unit 30 may locally process signals or portions of signals directly received from components within system 10. For example, control unit 30 may receive variable input signal 92 from sensor 24 and search the signal for portions that may be processed locally before passing the input signal on to host computer 94 as modified variable input signal 92'. Also, control unit 30 may provide modified input signal 92' to place input signal 92 in a format that may be readily understood or processed by host computer 94. Further, control unit 30 may optionally receive input signal 112 from haptic interface device 18, such as a signal from a button or trigger 111 located on the haptic interface device 18. Input signal 112 may be a signal that requires a reflexive response, such as the firing of a gun, for example. Rather than burdening host computer 94 with processing these types of signals, which may be very frequent, control unit 30 may provides the processing capability. Input signal 112 may be completely processed by control unit 30, thereby advantageously reducing the processing burden on host computer 94. The use of control unit 30 increases the efficiency of system 10 by performing force feedback computations in parallel with the force feedback computations being performed by host computer 94 in running the interactive program. Similarly, control unit 30 may receive concise high-level commands, comprising all or a portion of output signal 102, to be processed locally therein. These high-level commands may represent simple force feedback sensations that may be easily processed locally by control unit 30. Thus, in effect, control unit 30 provides a parallel processing capability to host computer 94 to maximize the overall efficiency of system 10.

Modified variable output signal 102' provided by control unit 30 may require further processing before being received by magnetically-controllable device 14. Modified signal 102' may be received by amplification device 90, for example, to boost the level of modified signal 102' to provide amplified variable output signal 102". Modified signal 102' may be a variable signal of low electrical current that is not sufficient to properly energize coil 80 to produce a magnetic field to the desired strength to provide the desired resistance forces. To solve this problem, amplification device 90 proportionally increases the strength or amperage of modified signal 102' to a level sufficient to properly energize coil 80. Thus, amplification device 90 advantageously allows lower strength signals to be processed within system 10, thereby saving cost by requiring less heavy duty components and less power, before boosting the signal to a level required to properly energize magnetically-controllable device 14.

As mentioned above, control unit 30 and amplification device 90 may be a part of computer system 20 or haptic interface unit 26 or they may be separate components within system 10. Those skilled in the art will realize that the various components described above may be combined in numerous manners without affecting the operability of the system. Similarly, some of the components, such as control unit 30 amplification device 90, may not be required if their function can be adequately performed by other system components, such as host computer 94. Thus, variation of the above-described configuration of system 10 is contemplated by the present invention.

Haptic interface system 10 comprises two closely coupled, interactive functions: a sensory input function and a force output function. The sensory input function tracks the operator's manual manipulation of the haptic interface device, feeding sensory data to the host computer representative of those manipulations. The force output function provides physical feedback to the operator in response to commands from the host computer. These two functions are intertwined in that the sensory input function generally varies in response to the force output function, and vice versa. In other words, the operator's manipulations of the haptic interface device are affected by the applied resistance forces, or force feedback, and the applied resistance forces are dependent upon the manipulations of the operator. Thus, haptic interface system 10 involves a very complex and continual interaction.

In operation, host computer 94 runs an interactive program, such as a game, using processor 98 to generate a video signal 114 received by display 22. Video signal 114 is an electrical signal used to generate an image, corresponding to an event occurring within the game, on display 22. Operator 12 responds to the event by moving baptic interface device 18, such as a steering wheel or a joystick, in conjunction with the viewed event. Sensor 24 sends variable input signal 92 comprising tracking information representing the position of the wheel or joystick to control unit 30. Control unit 30 may respond to the information by processing the information locally, and by forwarding the information, or a modified form of the information, as a modified input signal 92' to host computer 94. Even when processing information locally, control unit 30 may provide modified input signal 92' to host computer 94 and/or display 22 to update the generated image of the event to correspond with the latest input. Host computer 94 receives modified signal 92' from control unit 30 and inputs that information into processor 98 that is running the interactive game. Host computer 94, based on the processing of modified input signal 92', updates the image of the event generated on display 22 and provides an output signal 102 to affect the resistance forces, and hence the force feedback sensations, felt by operator 12 in moving the haptic interface device 18 (e.g. a wheel, joystick or other human interface). Output signal 102 may be modified by control unit 30 and amplified by amplification device 90 before reaching magnetically-controllable device 14 as amplified variable output signal 102". The amplified variable output signal 102" initiates a resistance force as computed by host computer 94 to coordinate with the event. Amplified variable output signal 102" thereby selectively energizes coil 80 or 80' within magnetically-controllable device 14 to produce a magnetic field. The magnetic field is applied across working space 48 or 48', affecting the shear strength of magnetically-controllable medium 44 or 44' contained within absorbent element 46 or 46'. The affect on the shear strength of medium 44 or 44' creates resistance forces between first member 36 or second member 36' and rotor 42, which is connected to haptic interface device 18 through shaft 40. As a result, operator 12 feels the resistance forces through baptic interface device 18. Thus, haptic interface system 10 imparts force resulting in active force feedback sensations to operator 12 through haptic interface device 18 to simulate the feel, for example, of jolting blasts, rigid or soft surfaces, viscous liquids, increased gravity, compliant springs, jarring vibrations, grating textures, heavy masses, gusting winds, and any other physics phenomenon that can be represented mathematically and computed by computer system 20.

While haptic interface system 10 has been described in reference to the particular embodiments of haptic interface units and magnetically-controllable devices described above, many other variations and configurations may be employed utilizing the teachings of a magnetically-controllable haptic interface system disclosed herein. There are a multitude of haptic interface devices 18 that each may require a different configuration of the components described above. For example, the particular haptic interface device may require linear, rotational, and partial rotational or curvilinear forces. The teachings set forth in this disclosure can be adapted to encompass such requirements. Similarly, other embodiments of a magnetically-controllable device 14 may be utilized to provide similar results. For example, magnetically-controllable devices that transfer unidirectional rotational energy, linear, and partial rotational or curvilinear energy may be required. Again, the principles disclosed herein may be adapted to encompass such requirements.

Although the invention has been described with reference to these preferred embodiments, other embodiments can achieve the same results. Variations and modifications of the present invention will be apparent to one skilled in the art and the following claims are intended to cover all such modifications and equivalents.

What is claimed is:

1. A haptic interface system for providing force feedback to an operator, comprising:
    a computer system for receiving a variable input signal and providing a variable output signal, said computer system adapted for running an interactive program that processes said variable input signal and in response derives said variable Output signal;
    a device including a magnetically-controllable medium, said device receives said variable output signal and provides a variable, active, force feedback based upon said variable output signal;
    a magnetic field generating device energizable by said variable output signal to provide a variable strength magnetic field;
    a first member adjacent to said magnetic field generating deivice, said first member adapted to receive an actuating energy;
    a second member adjacent to said magnetic field generating device adn in communication with said gaptic interface device;
    a haptic interface device adapted to be in operative contact with said operator for controlling and responding to said inteactive program, said haptic interface device in communication with said device and having a plurality of positions, said haptic interface device reciving said force feedback; and
    said magnetically-controllable medium located between said first and said second member, said magnetically-controllable medium providing variable resistance forces in response to said variable strength magnetic field between said first member and said second member for controlling said force feedback applied to said haptic interface device.

2. A haptic interface system as recited in claim 1, wherein said device comprises:
    a magnetic field generating device energizable by said variable output signal to provide a variable strength magnetic field;
    a first member adjacent to said magnetic field generating device;
    a second member adjacent to said magnetic field generating device and in communication with said haptic interface device;
    a motor in communication with at least said second member, said motor providing actuating energy; and
    said magnetically-controllable medium located between said first member and said second member, said magnetically-controllable medium providing variable resistance forces in response to said variable strength magnetic field between said first member and said second member for controlling said force feedback applied to said haptic interface device.

3. A haptic interface system as recited in claim 2, wherein said computer system further comprises a control unit having a microprocessor and firmware and
    a motor in communication with said first member, said motor providing said actuating energy.

4. A haptic interface system as recited in claim 3, further comprising an amplifier device in communication with said control unit and said device, said amplifier device receiving said modified output signal and providing an amplified output signal to said device.

5. A haptic interface system for providing force feedback to an operator, comprising:
    a computer system for receiving a variable input signal and providing a variable output signal corresponding to a feedback force, said computer system adapted for running an interactive program that processes said variable input signal and in response derives said variable output signal;
    a motor for providing actuating energy:
    a device including an absorbent element containing a magnetically-controllable medium that provides variable resistance, said device in communication with said computer system for receiving said variable output signal and providing a variable, active, feedback force from said actuating energy by varying the resistance of said magnetically-controllable medium based upon said variable output signal; and
    a haptic interface device adapted to be in operative contact with said operator for controlling and responding to said interactive program, said haptic interface device in communication with said device and having a plurality of positions, said haptic interface device receiving said feedback force.

6. A haptic interface system for providing force feedback to an operator, comprising:
    a host computer for receiving a variable input signal and providing a variable output signal and a video signal, said computer system adapted for running an interactive program that processes said variable input signal and in response derives said variable output signal;
    a device including a magnetically-controllable medium, said device receives said variable output signal and provides a variable, active, force feedback based upon said variable output signal;
    a haptic interface device adapted to be in operable contact with said operator for controlling and responding to said interactive program, said haptic interface device in communication with said device and having a plurality of positions, said haptic interface device receiving said force feedback;
    a sensor for identifying a detected position within said plurality of positions of said haptic interface device, said sensor providing said variable input signal based on said detected position; and
    a control unit having a microprocessor and firmware, said control unit in communication with said host computer, said sensor and said device, said control unit modifying said variable input signal into a format recognizable by said host computer, said control unit further modifying said variable output signal into a format recognizable by said device.

7. A haptic interface system as recited in claim 6, wherein said device comprises:
a motor for providing said actuating energy;
a first energizable portion responsive to said variable output signal, and in communication with said motor, for providing force feedback actuating energy in a first rotational direction; and
a second energizable portion responsive to said control signals, and in communication with said motor, for providing force feedback actuating energy in a second rotational direction.

8. A haptic interface unit, comprising:
a motor for providing actuating energy; and
a device including a magnetically-controllable medium, said device for receiving a variable input signal corresponding to a feedback force, said device variably transferring said actuating energy to produce said feedback force based on said output signal.

9. A haptic interface system as recited in claim 4, wherein said absorbent element is an open-celled foam.

10. A baptic interface system as recited in claim 9, wherein said absorbent element is a polyurethane material.

11. A haptic interface system as recited in claim 4, wherein said absorbent element is formed as a matrix structure having open spaces for retaining said magnetically-controllable medium.

12. A haptic interface system as recited in claim 11, wherein said magnetic field generating device is a coil.

13. A haptic interface system as recited in claim 12, wherein said coil comprises a wire having a number of turns and a gauge, wherein said number of turns and said gauge are dependent upon the desired range of said variable strength magnetic field.

14. A haptic interface system as recited in claim 13, wherein said output signal comprises a voltage and a current, and wherein said number of turns and said gauge are dependent upon a desired range of said voltage and said current, and wherein said voltage and said current are dependent upon a desired range of said variable strength magnetic field.

15. A haptic interface system as recited in claim 3, wherein said resistance forces are transferred to said haptic interface device through to second member.

16. A haptic interface system as recited in claim 15, wherein said second member is adapted for movement relative to said first member.

17. A haptic interface system as recited in claim 15, wherein said second member is adapted for rotational movement relative to said first member.

18. A haptic interface system as recited in claim 15, wherein said haptic interface device comprises a steering device.

19. A haptic interface system as recited in claim 18, wherein said haptic interface device comprises a joystick.

20. A haptic interface system as recited in claim 18, wherein said haptic interface device comprises a steering wheel.

21. A haptic interface system as recited in claim 1, wherein said interactive program is a video game.

22. A haptic interface system as recited in claim 2, wherein said computer system further comprises a host computer having a processor that runs said interactive program.

23. A haptic interface system as recited in claim 22, wherein said computer system further comprises a control unit having a microprocessor and firmware, said control unit modifying said variable input signal received from said sensor and providing a modified variable input signal to said host computer, said control unit further modifying said variable output signal and providing a modified output signal to said magnetically-controllable device.

24. A haptic interface system as recited in claim 23, further comprising an amplifier device in communication with said control unit and said magnetically-controllable device, said amplifier device receiving said modified output signal and providing an amplified output signal to said magnetically-controllable device.

25. A haptic interface system as recited in claim 1, further comprising a video display for displaying images resulting from the processing of said interactive program by said computer system.

26. A haptic interface system for providing force feedback to an operator, comprising:
a computer system for receiving a variable input signal and providing a variable output signal corresponding to a feedback force, said computer system adapted for running an interactive program that processes said variable input signal and in response derives said variable output signal;
a motor for providing actuating energy;
a magnetically-controllable device including an absorbent element containing a magnetically-controllable medium that provides variable resistance, said magnetically-controllable device in communication with said computer system for receiving said variable output signal and providing a variable, active, feedback force from said actuating energy by varying the resistance of said magnetically-controllable medium based upon said variable output signal; and
a haptic interface device adapted to be in operative contact with said operator for controlling and responding to said interactive program, said haptic interface device in communication with said magnetically-controllable device and having a plurality of positions, said haptic interface device receiving said feedback force;
a magnetic field generating device energizable by said variable output signal to provide a variable strength magnetic field;
a first member adjacent to said magnetic field generating device, said first member adapted to receive said actuating energy;
a second member adjacent to said magnetic field generating device and in communication with said haptic interface device;
said magnetically-controllable medium located between said first and said second member, said magnetically-controllable medium providing variable resistance forces in response to said variable strength magnetic field between said first member and said second member for controlling said force feedback applied to said haptic interface device.

27. A haptic interface system for providing force feedback to an operator, comprising:
a host computer for receiving a variable input signal and providing a variable output signal and a video signal, said computer system adapted for running am interactive program that processes said variable input signal and in response derives said variable output signal;

a magnetically-controllable device including a magnetically-controllable medium, said device receives said variable output signal and provides a variable, active, force feedback based upon said variable output signal;

a haptic interface device adapted to be in operable contact with said operator for controlling and responding to said interactive program, said haptic interface device in communication with said magnetically-controllable device and having a plurality of positions, said haptic interface device receiving said force feedback;

a sensor for identifying a detected position within said plurality of positions of said haptic interface device, said sensor providing said variable input signal based on said detected position; and a control unit having a microprocessor and firmware, said control unit in communication with said host computer, said sensor and said magnetically-controllable device, said control unit modifying said variable input signal into a format recognizable by said host computer, said control unit further modifying said variable output signal into a format recognizable by said magnetically-controllable device a magnetic field generating device energizable by said variable output signal to provide a variable strength magnetic field;

a first member adjacent to said magnetic field generating device, said first member adapted to receive said actuating energy;

a second member adjacent to said magnetic field generating device and in communication with said haptic interface device;

said magnetically-controllable medium located between said first and said second member, said magnetically-controllable medium providing variable resistance forces in response to said variable strength magnetic field between said first member and said second member for controlling said force feedback applied to said haptic interface device.

28. A haptic interface system as recited in claim 27, wherein said magnetically-controllable device comprises:
   a motor for providing actuating energy;
   a first energizable portion responsive to said variable output signal, and in communication with said motor, for providing force feedback actuating energy in a first rotational direction; and
   a second energizable portion responsive to said control signals, and in communication with said motor, for providing force feedback actuating energy in a second rotational direction.

29. A force feedback control system, comprising:
   a computer system for receiving a variable input signal and providing a variable output signal, said computer system adapted for running an interactive program that processes said variable input signal and in response derives said variable output signal corresponding to a level of rotational force feedback;
   a rotatable shaft for transferring said level of rotational force feedback;
   a rotor fixedly attached to said shaft, said rotor having a first side and a second side;
   a sensor device in communication with said rotatable shaft and said computer system, said sensor device providing said variable input signal representative of a rotational position of said rotatable shaft to said computer system;

a first rotatable member adjacent to said first side of said rotor;
   a second rotatable member adjacent to said second side of said rotor;
   a first coil disposed between said first rotatable member and said rotor, said first coil energizable in response to said variable output signal to produce a first, variable-strength magnetic field;
   a second coil disposed between said second rotatable member and said rotor, said second coil energizable in response to said variable output signal to produce a second, variable-strength magnetic field;
   a first absorbent matrix comprising a magnetically-controllable medium disposed between said first rotatable member and said rotor, said first absorbent matrix providing variable resistance between said first rotatable member and said rotor in proportion to the strength of said first magnetic field;
   a second absorbent matrix comprising said magnetically-controllable medium disposed between said second rotatable member and said rotor, said second absorbent matrix providing variable resistance between said second rotatable member and said rotor in proportion to the strength of said second magnetic field; and
   a motor for providing said rotational force feedback energy in communication with said first rotatable member and said second rotatable member, said motor adapted for rotating said shaft in a first direction by transferring energy through said first rotatable member to said rotor and said motor adapted for rotating said shaft in a second direction by transferring energy through said second rotatable member to said rotor through the selective energization of said first coil and said second coil.

30. A force feedback control system as recited in claim 29, further comprising a haptic interface device, in communication with said rotatable shaft, for receiving said rotational force feedback.

31. A force feedback control system as recited in claim 30, wherein said haptic interface device comprises a steering device.

32. A force feedback control system as recited in claim 30, wherein said haptic interface device comprises a joystick.

33. A force feedback control system as recited in claim 30, wherein said motor is in communication with said computer system and responsive to said force feedback control signals.

34. A device for providing active force feedback to an operator, comprising:
   a rotatable shaft;
   a rotor in communication with said shaft, said rotor having a first side and a second side;
   a first rotatable member on said first side of said rotor;
   a second rotatable member on said second side of said rotor;
   a magnetically-controllable medium disposed between said first rotatable, member and said rotor and disposed between said second rotatable member and said rotor, said magnetically-controllable medium having a shear rate that varies in response to the strength of an applied magnetic field for providing variable resistance between each of said first rotatable member and said rotor and said second rotatable member and said rotor; and
   a motor in communication with said first rotatable member and said second rotatable member, said motor adapted for bi-directionally rotating said shaft through the selective application of said magnetic field to said magnetically-controllable medium.

35. A device as recited in claim 34, wherein said motor is adapted for rotating said first rotatable member and said second rotatable member in opposite directions.

36. A device as recited in claim 35, wherein said motor is adapted for rotating said first rotatable member and said second rotatable member at the same time.

37. A device as recited in claim 36, further comprising:
a first coil disposed on said first side of said rotor, said first coil energizable to produce a magnetic field interacting with said magnetically-controllable medium for providing resistance forces between said first rotatable member and said rotor for rotating said shaft in a first direction; and
a second coil disposed on said second side of said rotor, said second coil energizable to produce a magnetic field interacting with said magnetically-controllable medium for providing resistance forces between said second rotatable member and said rotor for rotating said shaft in a second direction.

38. A device as recited in claim 37, further comprising:
a first absorbent structure disposed between said first rotatable member and said rotor, said first absorbent structure containing a portion of said magnetically-controllable medium; and
a second absorbent structure disposed between second rotatable member and said rotor, said second absorbent structure containing a portion of said magnetically-controllable medium.

39. A device as recited in claim 38, wherein each of said first absorbent structure and said second absorbent structure is compressed by a compression amount from a resting state.

40. A device as recited in claim 39, wherein said compression amount is in the range of about 30–70% of said resting state.

41. A device as recited in claim 38, wherein each of said first absorbent structure and said second absorbent structure is an open-celled foam.

42. A device as recited in claim 38, further comprising said rotor fixedly attached to said shaft, said rotor having a first recess within said first side and a second recess in said second side, and wherein said first coil is disposed within said first recess and said second coil is disposed within said second recess.

43. A device as recited in claim 38, wherein said first rotatable member comprises a first recess and said second rotatable member comprises a second recess, and wherein said first coil is disposed within said first recess and said second coil is disposed within said second recess.

44. A device as recited in claim 38, wherein said first rotatable member and said second rotatable member each comprise a body portion, and wherein said motor further comprises an output shaft that interconnects with said body portion.

45. A device as recited in claim 44, wherein said body portion for each of said first rotatable member and said second rotatable member further comprises a circumferential flange, and wherein said output shaft interacts with said circumferential flange.

46. A device as recited in claim 45, wherein said output shaft transfers rotational energy.

47. A device as recited in claim 45, wherein said output shaft transfers linear energy.

* * * * *